United States Patent
Carlson et al.

(10) Patent No.: US 9,478,964 B2
(45) Date of Patent: Oct. 25, 2016

(54) MULTIPLE CABLE STRAIN RELIEF

(71) Applicant: Dematic Corp., Grand Rapids, MI (US)

(72) Inventors: Randall J. Carlson, Grand Rapids, MI (US); Kenneth J. Kooistra, Byron Center, MI (US); Michael J. Kasper, Jenison, MI (US); Randall D. Houtman, Caledonia, MI (US)

(73) Assignee: Dematic Corp., Grand Rapids, MI (US)

( * ) Notice: Subject to any disclaimer, the term of this patent is extended or adjusted under 35 U.S.C. 154(b) by 379 days.

(21) Appl. No.: 14/054,938

(22) Filed: Oct. 16, 2013

(65) Prior Publication Data

US 2014/0198458 A1    Jul. 17, 2014

Related U.S. Application Data

(60) Provisional application No. 61/752,077, filed on Jan. 14, 2013.

(51) Int. Cl.
*H02G 15/00* (2006.01)
*H02G 15/007* (2006.01)

(52) U.S. Cl.
CPC .................................. *H02G 15/007* (2013.01)

(58) Field of Classification Search
CPC .... H02G 15/007; H02G 15/00; H02G 15/06; H02G 3/00; H02G 3/22; H02G 3/24; H02G 3/0437; F16L 3/2235; G02B 6/4471; G02B 6/3887
USPC ........ 174/135, 72 A, 72 C, 68.1, 68.3, 72 R, 174/88 R, 70 C, 95, 73.1; 248/49, 68.1
See application file for complete search history.

(56) References Cited

U.S. PATENT DOCUMENTS

| 4,719,321 | A  | * | 1/1988  | Kozel ................. | G02B 6/3887 174/135 |
| 4,775,121 | A  | * | 10/1988 | Carty .................... | F16L 3/2235 248/68.1 |
| 5,146,532 | A  | * | 9/1992  | Hodge ................ | G02B 6/4471 385/135 |
| 5,613,655 | A  | * | 3/1997  | Marion ................ | F16L 3/2235 248/68.1 |
| 5,992,802 | A  | * | 11/1999 | Campbell ............... | H02G 3/30 248/68.1 |
| 6,261,037 | B1 | * | 7/2001  | Richards ............... | F16L 3/2235 410/36 |
| 6,448,497 | B1 | * | 9/2002  | McCracken ......... | H02G 3/0437 174/72 C |
| 7,457,506 | B1 | * | 11/2008 | Osborne, II ......... | F16L 3/2235 248/68.1 |
| 8,294,030 | B2 | * | 10/2012 | Pollard, Jr. ............. | H02G 3/24 174/72 A |

\* cited by examiner

*Primary Examiner* — Angel R Estrada
(74) *Attorney, Agent, or Firm* — Gardner, Linn, Burkhart & Flory, LLP

(57) ABSTRACT

A multiple cable strain relief and electronic assembly having such multiple cable strain relief includes a body, a plurality of cable cutouts and a compression member. The body has at least two spaced apart sidewalls thereby defining a cavity between the sidewalls. The plurality of cable cutouts are in each of the sidewalls. Each cable cutout in one of the sidewalls is aligned with a cable cutout in the other of sidewalls thereby defining a cable cutout pair. The compression member has a retention position that is at least partially extending into the cavity. With the compression member in the retention position a cable extending though a cable cutout pair is deflected in the cavity to retain that cable between the sidewalls and the compression member.

20 Claims, 5 Drawing Sheets

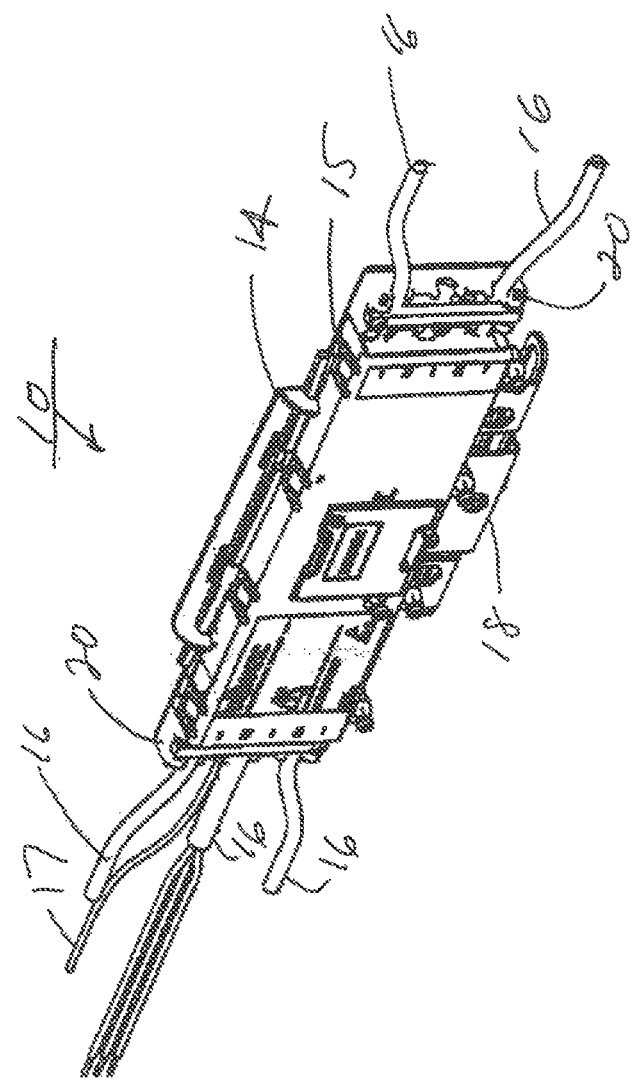
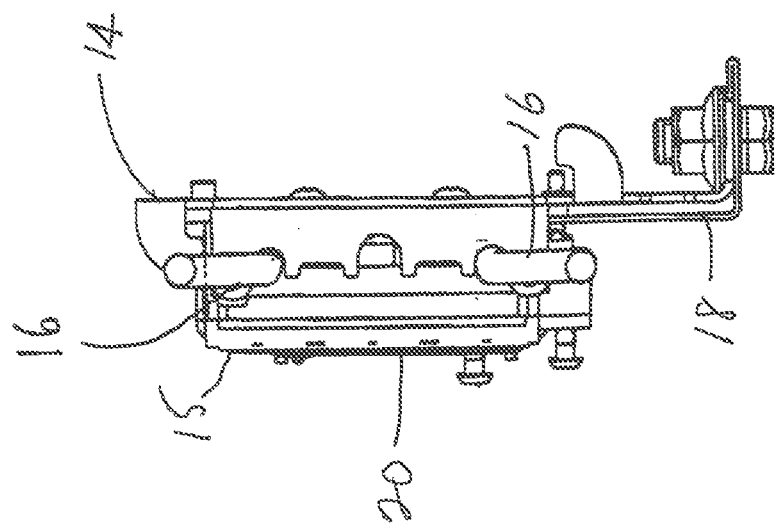

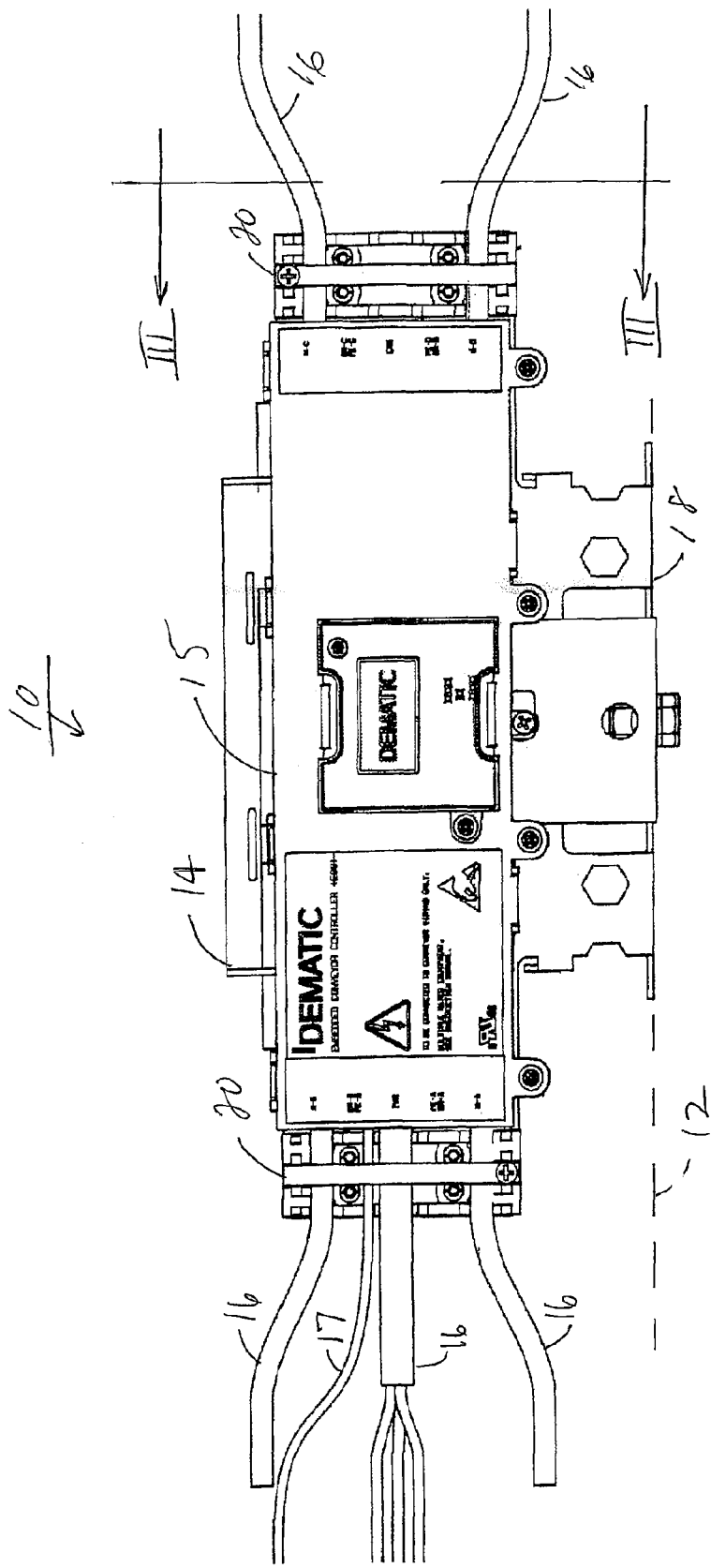

MULTIPLE CABLE STRAIN RELIEF

CROSS-REFERENCE TO RELATED APPLICATIONS

This application claims priority to U.S. provisional patent application Ser. No. 61/752,077 filed Jan. 14, 2013, the disclosure of which is hereby incorporated herein by reference in its entirety.

BACKGROUND OF THE INVENTION

The present invention is directed to a strain relief for protecting a cable connected with an electrical assembly, such as an electronic assembly, and such a strain relief that is useful to protect multiple such cables.

Electrical codes require that certain cables extending from an electronic assembly be protected by a strain relief. In particular, non-class II cables must be able to resist a 35 pound pull for a certain length of time. Non-class II cables are those which electrically conduct in excess of 100 watts. Class II cables are those which electrically conduct less than 100 watts, such as signal wires to prove signal level inputs to an electronic module or signal level outputs from an electronic module. The purpose of the strain relief is to remove or relieve a force inadvertently applied to the cable from extending to the connection of that cable to the electronic module of that electronic assembly. While strain reliefs are known, they are to protect a single cable, such as by anchoring the insulation of that cable to the housing for the electronic module.

When multiple cables extend from an electronic module, it may be possible to use multiple ones of know strain reliefs, one for each cable. However, such solution is not entirely satisfactory. Not only is it time-consuming to apply multiple such strain reliefs to the cables, but they take up space which could enlarge the housing size.

SUMMARY OF THE INVENTION

The present invention provides a unique solution for meeting code requirements for an electronic assembly having multiple cables connected with an electronic module.

A multiple cable strain relief and electronic assembly having such multiple cable strain relief, according to an aspect of the invention, includes a body, a plurality of cable cutouts and a compression member. The body has at least two spaced apart sidewalls thereby defining a cavity between the sidewalls. The plurality of cable cutouts are in each of the sidewalls. Each cable cutout in one of the sidewalls is aligned with a cable cutout in the other of the sidewalls thereby defining a cable cutout pair. The compression member has a retention position that is at least partially extending into the cavity. With the compression member in the retention position, a cable extending through a cable cutout pair is deflected in the cavity to retain that cable between the sidewalls and compression member.

The cable cutout pairs may be spaced apart on the sidewalls. Two or more cable cutout pairs may be included.

One or more signal wire cutouts may be provided in each sidewall. Each signal wire cutout in one of the sidewalls may be aligned with a signal wire cutout in the other of the sidewalls thereby defining a signal wire cutout pair. With the compression member in the retention position, a signal wire extending through a signal wire cutout pair is not deflected in the cavity by the compression member.

The cable cutouts may extend deeper into the cavity than each signal wire cutout does. The signal wire cutout pairs may alternate with the cable cutout pairs. Each of the cable cutouts may be in a generally semi-circular shape. Each of the signal wire cutouts may be generally flat in shape.

The compression member may have a first position away from the cavity. A cable or signal wire can be positioned across the cavity when the compression member is in the first position. The compression member may be pivotally mounted at one end. A fastener may be provided at an opposite end of the compression member to hold the compression member in the retention position. The compression member may be generally bar-shaped.

These and other objects, advantages and features of this invention will become apparent upon review of the following specification in conjunction with the drawings.

BRIEF DESCRIPTION OF THE DRAWINGS

FIG. 1 is a perspective view of an electronic assembly according to an embodiment of the invention;

FIG. 2 is a front elevation view of the electronic assembly in FIG. 1;

FIG. 3 is a side elevation view of the electronic assembly in FIG. 1 taken from the view III-III in FIG. 2;

DESCRIPTION OF THE PREFERRED EMBODIMENT

Figure 4:
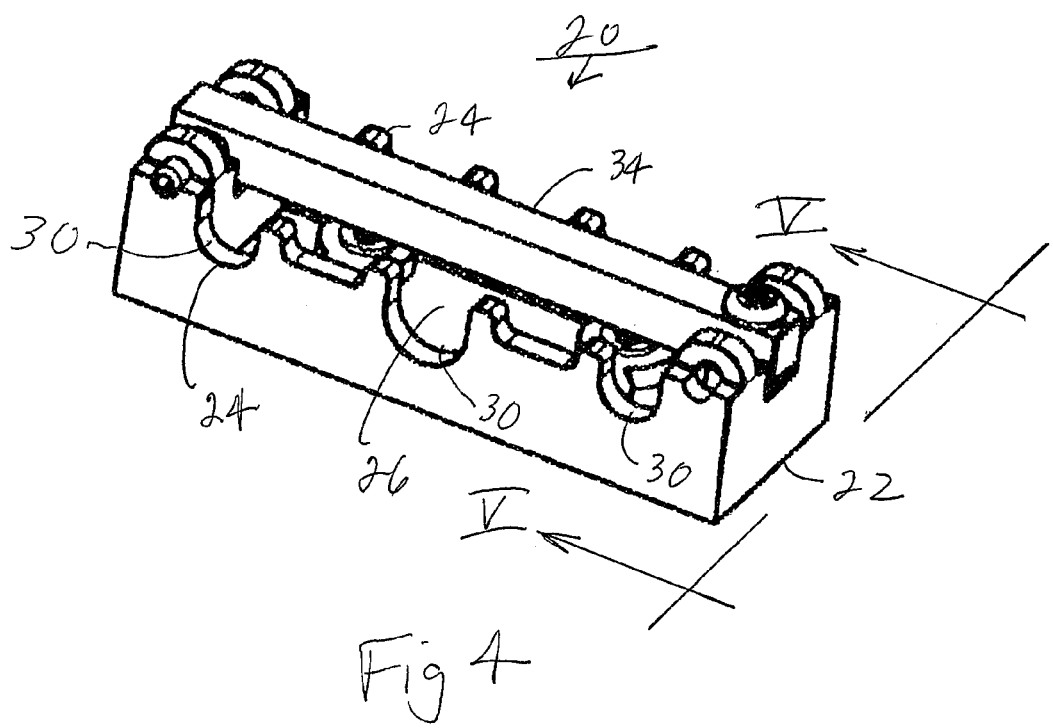
FIG. 4 is a perspective view of a multi-cable strain relief according to an embodiment of the invention.
Figure 5:
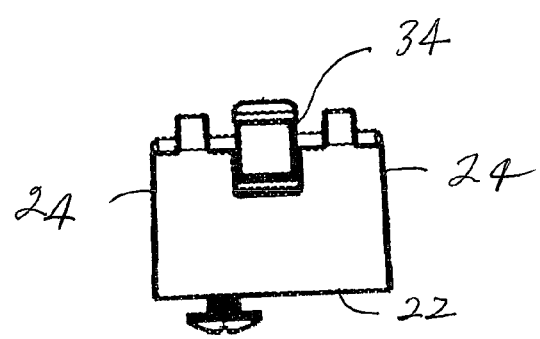
FIG. 5 is an end elevation view of the multi-cable strain relief in FIG. 4 taken from the view V-V in FIG. 4.
Figure 6:
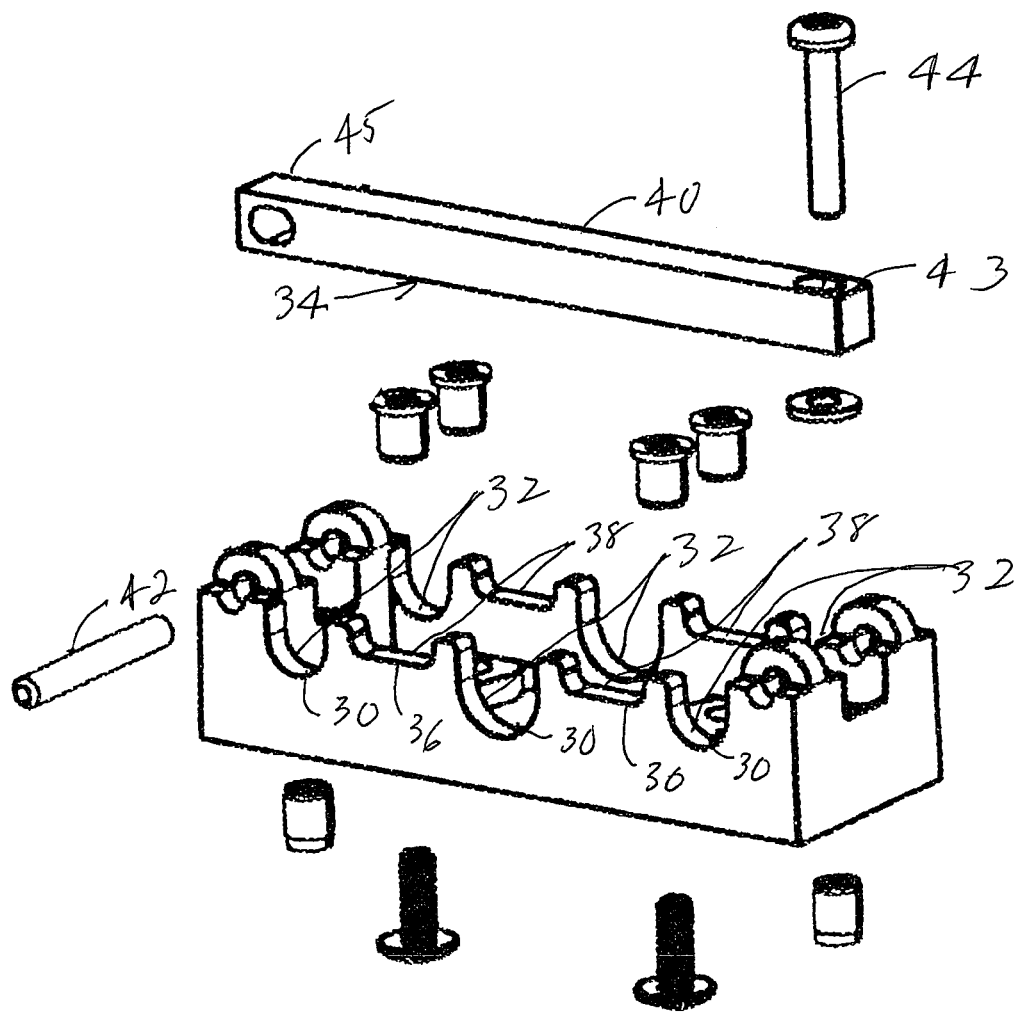
FIG. 6 is an exploded perspective view of the multi-cable strain relief in FIG. 4.

Referring now to the drawings and the illustrative embodiments depicted therein, an electronic assembly 10 may be used, such as with a conveyor system 12, in order to control one or more electrical devices of the conveyor system. In the illustrated embodiment, electronic assembly 10 is used to operate a motorized roller (not shown) of a conveying surface, such as by controlling electrical commutation of the internal motor to propel a roller shell surrounding that motor. In the illustrated embodiment, electronic assembly 10 may be a dual motor controller of the type referred to in U.S. Patent Application Publication No. 2010/0179686 A1 entitled Dual Power Motorized Roller or an integrated control to operate multiple motorized rollers, such as of the type disclosed in U.S. Pat. No. 7,360,638 B2 entitled Integrated Control Card for Conveying Systems, the disclosures of which are hereby incorporated hereby by reference. Electronic assembly 10 has an electronic module 14, a housing 15 for module 14 and a mounting bracket 18 for mounting housing 15 to a stationary support. Because an electrical cable is supplied to each such electric motor cartridge or to each motorized roller, electronic assembly 10 has a plurality of cables 16 extending from housing 15. Electronic module 14 within housing 15 has an electrical connection with each cable 16.

Electronic assembly 10 includes a multiple cable strain relief 20 for cables 16. Two such multiple-cable strain reliefs 20 are shown: one for cables extending from one side of electronic module 14 and one for the cable extending from the opposite side of electronic module 14. Strain relief 20 includes a body 22, a plurality of cable cutouts 30 and a compression member 34. Body 22 has at least two spaced apart sidewalls 24. Sidewalls 24 are interconnected by a bottom wall 28 thereby defining a cavity 26 between sidewalls. Cable cutouts 30 are in each sidewall 24. Each cable cutout 30 in one of the sidewalls 24 is aligned with a cable cutout 30 in the other sidewall thereby defining a cable cutout pair 32. Compression member 34 has a retention position (shown in FIG. 4) that is at least partially extending into cavity 26. With compression member 34 in the retention position, a cable 16 extending though a cable cutout pair 32 applies a retention force to the cables to retain the cables between sidewalls 24 and compression member 34.

Cable cutout pairs 32 are spaced apart on sidewalls 24 and include cutout pairs for each of multiple cables 16. In the illustrated embodiment, there are at least three cable cutout pairs. However, the number of cable cutouts pairs can be selected and spaced apart along sidewalls 24 to accommodate a greater or lesser number of cables 16.

In addition to having a plurality of electrical cables 16, electronic assembly 10 may include a plurality of Type II cables 17, such as signal wires used to supply sensing inputs to electronic module 14 from photo sensors, proximity sensors, motion encoders, or the like. Such Type II cables 17 tend to be of a smaller diameter than the non-type II cables 16 and tend to carry less harmful power levels. Also, such class II cables 17 do not require strain relief. Strain relief 20 includes one or more signal wire cutouts 36 in each of the sidewalls 24. Each signal wire cutout 36 in one of the sidewalls is aligned with a said signal wire cutout 36 in the other of the sidewalls thereby defining a signal wire cutout pair 38. With compression member 34 in its retention position shown in FIG. 4, a signal wire(s) extending though a signal wire cutout pair is not deflected in cavity 26. Therefore, multi-cable strain relief 20, in the illustrated embodiment, does not provide strain relief to signal wires, such as class II wires. Instead, signal wire cutouts 36 provide convenient conduit for routing such signal wires in a neat and orderly manner.

Each cable cutout 30 is sized for the diameter, and possibly other parameters, of the non-type II cable 16 so that compression member 34 compresses each cable 16 sufficiently to provide the desired strain relief function. However, as a general principle, each cable cutout 30 extends deeper into cavity 26 than does each said signal wire cutout 36. This compensates for the typical difference in diameters of the non-type II cables 16 versus the type II signal wires 17. In the illustrated embodiments, signal wire cutout pairs 38 alternate with cable cutout pairs 32. Each of the cable cutouts 34 is in a generally semi-circular shape. Each of the signal wire cutouts is generally flat, or rectangular.

Compression member 34 is pivotally mounted by a pivot 42 at one end 43 and pivots between a first cable-insertion position away from cavity 26 and a retention position shown in FIG. 4. A cable 16 or signal wire 17 can be positioned in cutout pairs 32, 38 across cavity 26 when compression member 34 is in the first cable-insertion position. When compression member 34 is then moved to the retention position, all of the cables 16 are provided with strain relief at the same time. Any signal wires 17 are captured in their respective signal wire cutout pair for convenient routing of the signal wires. Thus, one motion of compression member 34 provides strain relief for multiple cables and/or routing of multiple signal wires. A fastener 44 is provided at an opposite end 45 of compression member 34 to hold the compression member in the retention position. In the illustrated embodiment, the compression member is in the shape of a generally bar-shape, but could take on other shapes as well including indents that interface with cutout pairs 32, 38. Of course, other arrangements could be made for holding the compression member in retention position, such as fasteners at both ends of compression member 34, or the like.

Figure 7:
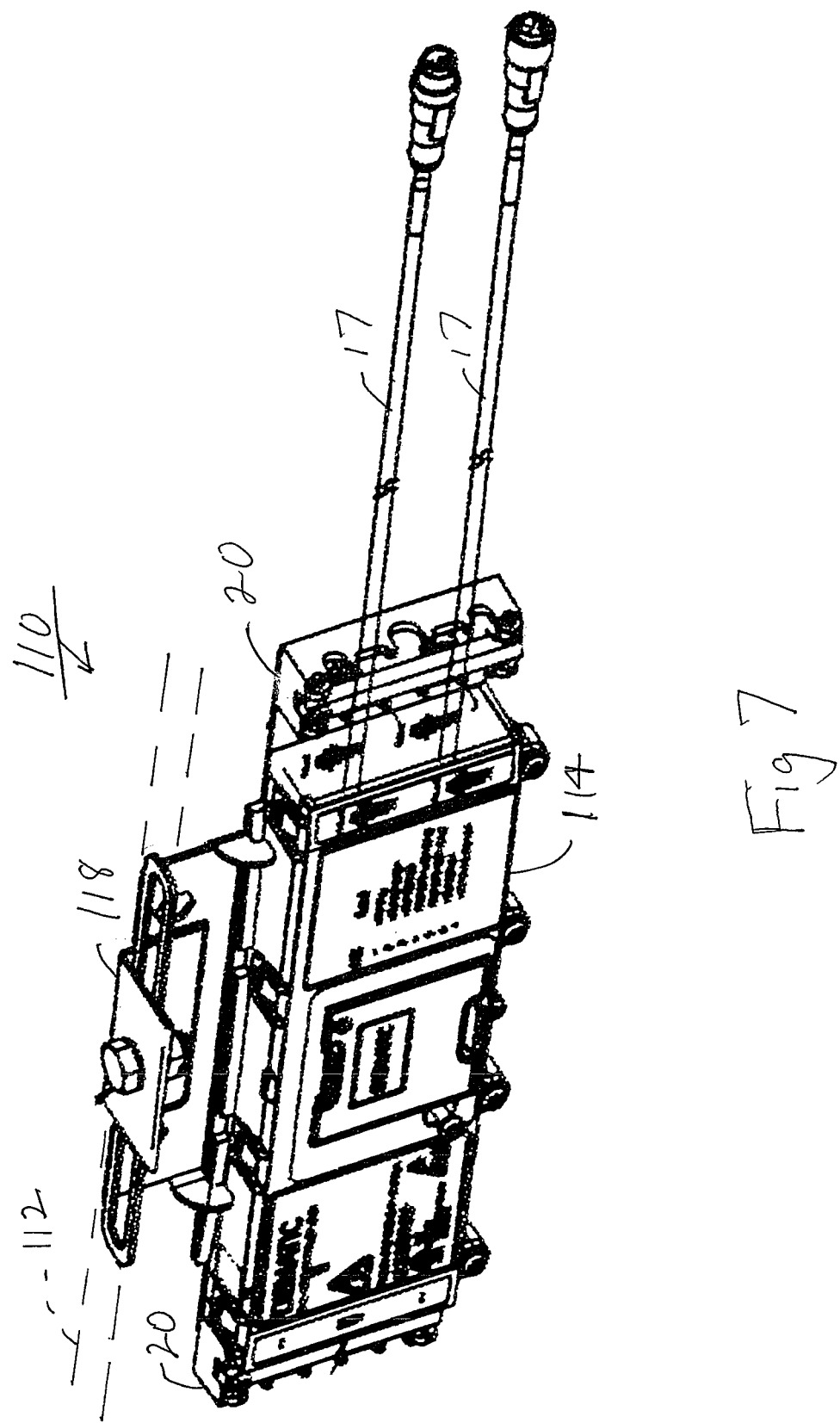
FIG. 7 is a perspective view of an electronic assembly according to an alternative embodiment of the invention.

An alternative embodiment of an electronic assembly 110 has an electronic module 114 that is mounted to a conveyor system 112 by a mounting bracket 118. Mounting bracket 118 mounts electronic module 114 from the top to the conveyor system. Electronic assembly 110 has at least one multiple-cable strain relief 20 on an opposite end thereof and may have another multiple-cable strain relief 20 on an opposite end thereof. In the embodiment illustrated in FIG. 7, multiple-cable strain relief 20 is illustrated as routing two type II signal wires 17, although a greater or lesser number may be accommodated. Also, one or more non-type II cables (not shown) may be accommodated.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A multiple cable strain relief, comprising:
   a body, said body having at least two spaced apart sidewalls, said sidewalls defining a cavity between said sidewalls;
   a plurality of said cable cutouts in each of said sidewalls, each said cable cutout in one of said sidewalls aligned with said cable cutout in the other of said sidewalls thereby defining a cable cutout pair;
   a compression member, said compression member having a retention position that is at least partially extending into said cavity, wherein with said compression member in said retention position a cable extending though said cable cutout pair is deflected in said cavity to retain that cable between said sidewalls and said compression member; and
   at least one signal wire cutout in each of said sidwalls, each said signal wire cutout in one of said sidewalls is aligned with said signal wire cutout in the other of said sidewalls thereby defining a signal cutout pair, wherein with said compression member in said retention position a signal wire extending through said signal wire cutout pair is undeflected in said cavity by said compression member.

2. The multiple cable strain relief as claimed in claim 1 wherein said cable cutout pairs are spaced apart on said sidewalls.

3. The multiple cable strain relief as claimed in claim 1 including at least two said cable cutout pairs.

4. The multiple cable strain relief as claimed in claim 1 wherein each said cable cutout extends deeper into said cavity than each said signal wire cutout.

5. The multiple cable strain relief as claimed in claim 1 wherein said signal wire cutout pairs alternate with said cutout pairs.

6. The multiple cable strain relief as claimed in claim 1 wherein each of said cable cutouts is generally semi-circular in shape.

7. The multiple cable strain relief as claimed in claim 1 wherein each of said signal wire cutouts is generally flat in shape.

8. The multiple cable strain relief as claimed in claim 1 wherein said compression member has a first position away from said cavity, wherein a cable or signal wire can be positioned across said cavity when said compression member is in said first position.

9. The multiple cable strain relief as claimed in claim 8 wherein said compression member is pivotally mounted at one end and including a fastener at an opposite end of said compression member, said fastener holding said compression member in said retention position.

10. The multiple cable strain relief as claimed in claim 9 wherein said compression member is generally bar-shaped.

11. An electronic assembly, comprising:
an electronic module, a housing for said electronic module, a plurality of electrical cables connected with said electronic module;
a multiple cable strain relief, including a body, a plurality of said cable cutouts and a compression member, said body having at least two spaced apart sidewalls, said sidewalls defining a cavity between said sidewalls, said plurality of cable cutouts being in each of said sidewalls, each said cable cutout in one of said sidewalls aligned with a said cable cutout in the other of said sidewalls thereby defining a cable cutout pair, said compression member having a retention position that is at least partially extending into said cavity, wherein with said compression member in said retention position, one of said cables extending though said cable cutout pair is deflected in said cavity to retain said one of said cables between said sidewalls and said compression member;
at least one signal wire cutout in each of said sidewalls, each said signal wire cutout in one of said sidewalls aligned with a said signal wire in the other of said sidewalls thereby defining a signal cutout pair; and
a signal wire connected with said electronic module wherein with said compression member in said retention position said signal wire extending though said signal wire cutout pair is undeflected in said cavity by said compression member.

12. The electronic assembly as claimed in claim 11 wherein said cable cutout pairs are spaced apart on said sidewalls.

13. The electronic assembly as claimed in claim 11 including at least two said cable cutout pairs.

14. The electronic assembly as claimed in claim 11 wherein each said cable cutout extends deeper into said cavity than each said signal wire cutout.

15. The electronic assembly as claimed in claim 11 wherein said signal wire cutout pairs alternate with said cutout pairs.

16. The electronic assembly as claimed in claim 11 wherein each of said cable cutouts is generally semi-circular in shape.

17. The electronic assembly as claimed in claim 11 wherein each of said signal wire cutouts is generally flat in shape.

18. The electronic assembly as claimed in claim 11 wherein said compression member has a first position away from said cavity, wherein one of said cables can be positioned across said cavity when said compression member is in said first position.

19. The electronic assembly as claimed in claim 18 wherein said compression member is pivotally mounted at one end and including a fastener at an opposite end of said compression member, said fastener holding said compression member in said retention position.

20. The electronic assembly as claimed in claim 19 wherein said compression member is generally bar-shaped.

* * * * *

UNITED STATES PATENT AND TRADEMARK OFFICE
CERTIFICATE OF CORRECTION

PATENT NO. : 9,478,964 B2
APPLICATION NO. : 14/054938
DATED : October 25, 2016
INVENTOR(S) : Randall J. Carlson et al.

Page 1 of 1

It is certified that error appears in the above-identified patent and that said Letters Patent is hereby corrected as shown below:

In the Claims

Column 4
Line 49, Claim 1, "sidwalls" should be --sidewalls--

Column 6
Line 1, Claim 11, Insert --cutout-- after "wire"

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*